US007782469B2

(12) United States Patent
Kim (10) Patent No.: US 7,782,469 B2
(45) Date of Patent: Aug. 24, 2010

(54) METHOD FOR DETERMINING OPTIMAL RESONANT LENGTH TO MAXIMIZE WAVE INTENSITY IN RESONANT STRUCTURE

(75) Inventor: Jong Bae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 11/946,980

(22) Filed: Nov. 29, 2007

(65) Prior Publication Data

US 2008/0137085 A1 Jun. 12, 2008

(30) Foreign Application Priority Data

Dec. 7, 2006 (KR) .................. 10-2006-0123841

(51) Int. Cl.
*G01B 9/02* (2006.01)
(52) U.S. Cl. .................................... 356/519
(58) Field of Classification Search ......... 356/450, 356/454, 455, 519, 461
See application file for complete search history.

(56) References Cited

U.S. PATENT DOCUMENTS

| 4,011,013 | A | * | 3/1977 | Barrett ................. 356/454 |
| 4,952,059 | A | * | 8/1990 | Desurvire et al. ......... 356/461 |
| 5,305,087 | A | * | 4/1994 | Bernard et al. ............ 356/461 |
| 5,355,247 | A | * | 10/1994 | Byer et al. .................. 372/22 |
| 5,787,102 | A | * | 7/1998 | Alexander et al. ........... 372/22 |
| 6,101,023 | A | | 8/2000 | Meyer, Jr. et al. |
| 6,108,085 | A | * | 8/2000 | Sheik-Bahae ............... 356/450 |
| 6,167,067 | A | | 12/2000 | Meyer, Jr. et al. |
| 6,201,638 | B1 | * | 3/2001 | Hall et al. .................. 359/346 |
| 6,282,014 | B1 | | 8/2001 | Long |
| 6,456,380 | B1 | * | 9/2002 | Naganuma .................. 356/450 |
| 6,538,744 | B1 | * | 3/2003 | Kimura-Suda et al. ...... 356/450 |
| 6,657,730 | B2 | * | 12/2003 | Pfau et al. .................. 356/477 |
| 6,757,307 | B2 | | 6/2004 | Hogan |
| 7,046,365 | B1 | * | 5/2006 | Aoshima et al. ............ 356/450 |
| 7,110,122 | B2 | * | 9/2006 | Van Brocklin et al. ...... 356/506 |

(Continued)

FOREIGN PATENT DOCUMENTS

JP 5-82868 4/1993

(Continued)

OTHER PUBLICATIONS

I. Brener, et al; "Cascaded X2 wavelength converter in LiNbO3 waveguides with counter-propagating beam;" Electronics Letters, Jul. 8, 1999, vol. 35, No. 14.

(Continued)

*Primary Examiner*—Gregory J Toatley, Jr.
*Assistant Examiner*—Scott M Richey
(74) *Attorney, Agent, or Firm*—Ladas & Parry LLP (57) ABSTRACT

Provided is a method for determining the optimal resonant length, among a large number of local resonant lengths which satisfy a resonant condition, that maximizes wave intensity in a resonant structure. In the second harmonic generation or the cascaded difference frequency generation device using the resonant structure by which the second harmonic wave of a pump wave resonates, the optimal resonant length is determined so that the intensity of an optical wave is maximized. The intensity distribution of the optical wave is defined, according to the resonant feedback condition or the no-resonant feedback condition, as a function of the resonant lengths to determine the optimal resonant length.

17 Claims, 4 Drawing Sheets

U.S. PATENT DOCUMENTS

| | | | |
|---|---|---|---|
| 7,212,292 B2 * | 5/2007 | Van Brocklin et al. | 356/519 |
| 7,239,442 B2 * | 7/2007 | Kourogi et al. | 359/346 |
| 7,433,043 B2 * | 10/2008 | Birge et al. | 356/450 |
| 2003/0035118 A1 * | 2/2003 | Clark | 356/519 |

FOREIGN PATENT DOCUMENTS

| | | |
|---|---|---|
| JP | 7-130648 | 5/1995 |
| JP | 09-191147 | 7/1997 |
| JP | 9-246631 | 9/1997 |
| JP | 2002-076478 | 3/2002 |
| KR | 19990042554 | 6/1999 |
| KR | 1020050096247 | 10/2005 |

OTHER PUBLICATIONS

Chang-Qing Xu, et al; "Intracavity wavelength conversions employing a MgO-doped LiNbO3 quasi-phase-matched waveguide and an erbium-doped fiber amplifier;" J. Opt. Soc. Am. B/vol. 20, No. 10, Oct. 2003.

Gerald T. Moore, "Resonant Sum-Frequency Generation;" IEEE Journal of Quantum Electronics, vol. 38, No. 1, Jan. 2002.

* cited by examiner

METHOD FOR DETERMINING OPTIMAL RESONANT LENGTH TO MAXIMIZE WAVE INTENSITY IN RESONANT STRUCTURE

CROSS-REFERENCE TO RELATED APPLICATION

This application claims priority to and the benefit of Korean Patent Application No. 2006-123841, filed Dec. 7, 2006, the disclosure of which is incorporated herein by reference in its entirety.

BACKGROUND

1. Field of the Invention

The present invention relates to a method for determining an optimal resonant length, among a large number of local resonant lengths which satisfy a resonant condition, that maximizes wave intensity in a resonant structure, and more precisely, to a method for determining the optimal resonant length by which the intensity of a resonant second harmonic wave of a pump wave is maximized in a resonant device configured so that the second harmonic wave resonates in a process including the second-order nonlinear interaction, and to a method for determining the optimal resonant length by which the intensity of a converted wave is maximized in a cascaded difference frequency generation process using the resonant second harmonic wave. The present invention has been produced from the work supported by the IT R&D program of MIC (Ministry of Information and Communication)/IITA (Institute for Information Technology Advancement) [2005-S054-02, 40G Module] in Korea.

2. Discussion of Related Art

Since the optical phenomenon related to second-order nonlinearity was first discovered, a main concern has been to improve conversion efficiency in phenomenological processes. Several attempts have been made to obtain higher conversion efficiency, including the attempts to discover or synthesize a new material of high-nonlinearity structure, to perform phase matching in various ways, to fabricate a nonlinear material in a form of an optical waveguide to increase interaction in three wave mixing, or to use a resonant structure.

In a second-order nonlinear optical phenomenon, the second harmonic generation means generating an optical wave of a doubled frequency 2Wp by putting a pump wave of frequency Wp into a second-order nonlinear medium. Difference frequency generation in the phenomenon means obtaining a new converted wave of frequency Wi corresponding to a frequency difference between a signal wave of frequency Ws and the pump wave of frequency Wp through the three wave mixing based on the second-order nonlinearity (see J. A. Armstrong, N. Bloembergen, J. Ducuing, and P. S. Pershan, "Interactions between Light in A Nonlinear Dielectric," Phys. Rev., vol. 127, pp. 1918-1939, 1962). The second-order nonlinear optical processes are all-optical interaction excluding electrical interaction, and in particular, the difference frequency generation process can be applied to wavelength conversion in high-speed optical communication. The converted wave generated at this time has a conjugated phase through the second-order nonlinear interaction. Accordingly, the difference frequency generation process can be also applied to dispersion compensation in the high-speed optical communication.

Meanwhile, the direct difference frequency generation is to obtain the converted wave corresponding to a difference frequency Wi (=Wp−Ws) by putting the signal wave of Ws and the pump wave of Wp directly into the second-order nonlinear medium. The cascaded difference frequency generation difference frequency generation is to obtain the converted wave of Wi (=2Wp−Ws) corresponding to a difference frequency in a cascaded way, through a simultaneous interaction between the second harmonic wave of the pump wave Wp and the signal wave Ws, after putting the signal wave and the pump wave and then generating the second harmonic wave of a doubled frequency (Wp+Wp=2Wp) (see B. Zhou, C. Q. Xu, and B. Chen, "Comparison of Difference Frequency Generation and Cascaded Based Wavelength Conversion in LiNbO$_3$ Quasi-phase-matched Waveguides," J. Opt. Soc. Am. B. 20, pp. 846-852, 2003). When the wavelength of the converted wave Wi is not greatly different from the wavelength of the incident signal wave Ws in a wavelength range for the optical communication (Wi~Ws), the direct difference frequency generation necessarily requires a new light source corresponding to the frequency of 2Wp, while the cascaded difference frequency generation does not require another new light source corresponding to the frequency of 2Wp. Thus the cascaded difference frequency generation can instead use the same type of light source operating in the communication wavelength range for the pump wave (Wp~Wi~Ws).

However, in case of the cascaded difference frequency generation, when the pump wave and the signal wave pass through the nonlinear medium, the pump wave first generates the second harmonic wave through the nonlinear interaction, and then the second harmonic wave of the pump wave generates the converted wave through the nonlinear interaction with the signal wave. As such, the cascaded difference frequency generation is a sequential process ($\chi^{(2)}$:$\chi^{(2)}$) using the continuous second-order nonlinear interaction. Accordingly, this process exhibits relatively low conversion efficiency, and so most of the signal wave, the pump wave, and the second harmonic wave go out together with the converted wave as they are without participating in the nonlinear interaction.

A resonant structure was devised for the reutilization of the outgoing waves as they were, in which a natural crystal medium was used so that the pump wave or the second harmonic wave might resonate in the second harmonic generation (see A. Ashkin, G. D. Boyd, and J. M. Dziedzic, "Resonant Optical Second Harmonic Generation and Mixing," IEEE J. Quantum Electron, vol. 2, pp. 109-124, 1966). After then, a resonator using an optical fiber ring was designed (See C. Q. Xu, K. Shinozaki, H. Okayama, and T. Kamijoh, "Three Wave Mixing using a Fiber Ring Resonator," J. Appl. Phys., vol. 81, pp. 1055-1062, 1997). In the cascaded difference frequency generation using the resonant structure, a fiber ring resonator for resonating the pump wave was suggested for a scheme to increase the output intensity (see C. Q. Xu, J. Bracken, and B. Chen, "Intracavity Wavelength Conversion employing a MgO-doped LiNbO$_3$ Quasi-phase Matched Waveguide and an Erbium-doped Fiber Amplifier," J. Opt. Soc. Amer. B, vol. 20, pp. 2142-2149, 2003). Recently however, instead of resonating the pump wave, various schemes for generating the cascaded difference frequency through resonating the second harmonic wave, which was generated through the second-order nonlinear interaction, in the resonant structure were invented (see Jong-Bae Kim, Jung-Jin Kim, Min-Su Kim, and Byung-Ha Lee, "Cascaded Difference Frequency Generation Device using Resonant Structure" KR Patent No. 0568504, 2006).

A device of a resonant type shows better conversion efficiency when compared with a conventional device of a traveling-wave type through which an optical wave propagates in a single pass. This is generally because the optical wave resonating in the resonant structure increases the wave intensity by accumulation. As the device length inducing the second-order nonlinear interaction increases, the wave intensity increases due to the increased second-order nonlinear interaction, but as the device length increases, the propagation loss increase as well and thus decreases the wave intensity to some extent. Similarly, the optical wave resonating in the resonant structure can possess stronger intensity by means of accumulation, but as the resonant length gets longer, the propagation loss gets larger and thus decreases the wave intensity. Therefore, it is intuitively expected that the resonant device using the resonant structure will possess the optimal resonant length by which wave intensity is maximized, as the increase of the wave intensity due to the accumulation and the decrease of the wave intensity due to the propagation loss are properly balanced.

In a real situation, the resonant condition in the resonant structure to be discussed later is represented as $2k_h L + arg(r_1) + arg(r_2) = 2\pi m$. Here, for a given wave vector $k_h$ and reflection coefficients $r_1$ and $r_2$, since the integer m can in principle exist infinitely as m=0, 1, 2, 3, . . . , this implies that the resonant length L that satisfies the resonant condition can also exist discretely and infinitely. When the basic interval of the discrete resonant lengths corresponding to the given integers is calculated, it is represented as $\Delta L = \pi/k_h$. The basic interval is a very small value of $\Delta L = 173.572$ nm when calculated numerically by using $\lambda_h = 1.55/2$ nm and $n_h = 2.2357$.

Since the basic interval is such an extremely small value, in view of reality, the practical length of devices satisfying the resonant condition seems almost continuous. Hence, for the observation of resonance up to now, after an arbitrary length is selected conventionally and then the resonant condition is satisfied at the selected length by dint of controlling external conditions precisely. When compared with arbitrary lengths out of the resonant condition, the resonant wave possesses the local maxima of different magnitudes at different resonant lengths, but when a large number of the local maxima corresponding to a large number of the resonant lengths are compared with one another once again, remarkably, among the local maxima there exists a global maximum corresponding to the optimal resonant length.

However, the methods concerned with the resonant structure up to now provide at most slightly better conversion efficiency, and are completely ignorant of the fact that the resonant length can be optimized. In addition, an arbitrary resonant length is selected at one's own will because there is no way of determining the optimal resonant length at all. Accordingly, in the conventional methods there is an important and serious problem in maximizing the wave intensity to be obtained by using the resonant structure effectively.

SUMMARY OF THE INVENTION

The present invention is directed to a method for determining the optimal resonant length, among a large number of local resonant lengths which satisfy a resonant condition, by which the intensity of the resonant second harmonic wave of the pump wave is globally maximized in the resonant device configured so that the second harmonic wave resonates in a process including the second-order nonlinear interaction, and a method for determining the optimal resonant length by which the intensity of the converted wave is maximized in the cascaded difference frequency generation process using the resonant second harmonic wave.

The present invention is also directed to a method for determining the optimal resonant length according to the feedback conditions of the resonant wave.

One aspect of the present invention provides a method for determining the optimal resonant length for the global maximization of the wave intensity in the resonant structure including the nonlinear medium for receiving the pump wave to generate the second harmonic wave, or for receiving the pump wave and the signal wave to generate the converted wave having the difference frequency through the interaction of the signal wave and the second harmonic wave that is generated from the pump wave and made to resonate in the resonant structure.

The other aspect of the present invention provides a method for determining the optimal resonant length in the resonant structure, comprising the steps of: calculating the intensity of an optical wave inside the resonant structure or of an optical wave going out from the resonant structure that depends on the resonant condition including the intensity of the incident wave, the optical interaction inside the resonant structure, the propagation loss, and the number of resonant cycle etc.; and determining the optimal resonant length by theoretically calculating or experimentally measuring the intensity of the optical wave while changing resonant lengths to define the intensity distribution of the optical wave as a function of the resonant lengths.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 1:
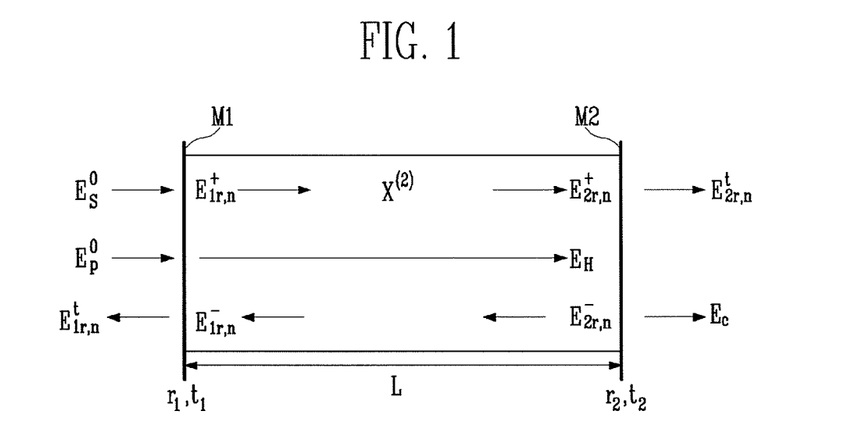
FIG. 1 is a schematic diagram illustrating a resonant device of the second harmonic generation and the cascaded difference frequency generation according to an exemplary embodiment of the present invention.

FIG. 1 is a schematic diagram illustrating a resonant device of the second harmonic generation and the cascaded difference frequency generation according to an exemplary embodiment of the present invention.

A resonant device of the second harmonic generation or the cascaded difference frequency generation includes a resonant structure for resonating the second harmonic wave 2Wp of the pump wave Wp after receiving the pump wave Wp without or together with the signal wave Ws, and the nonlinear medium in the resonant structure for generating the second harmonic wave 2Wp and generating the converted wave Wi corresponding to the difference frequency by combining the signal wave Ws and the second harmonic wave 2Wp in a cascaded way. In FIG. 1, the resonant structure is shown using dielectric mirrors. For the convenience of illustration, it is assumed that the resonant length and the nonlinear interaction length L are the same, but the present invention is not limited thereto.

Meanwhile, the "resonant structure" is not particularly limited only if it transmits the signal wave, the pump wave, and the converted wave but reflects the second harmonic wave, so that the second harmonic wave is not transmitted but resonates through reciprocation or circulation. For example, the resonant structure may consist of two reflection mirrors, lattice mirrors of the nonlinear medium itself, fiber lattice mirrors, fiber loop mirrors, fiber loop resonators, or the like. An example of such a resonant structure is disclosed in KR Patent No. 0568504.

Referring to FIG. 1, the resonant structure consists of the first dielectric mirror M1 provided at one side of a nonlinear material and the second dielectric mirror M2 provided at the other side of the nonlinear material. The first dielectric mirror M1 and the second dielectric mirror M2 are facing each other in parallel, providing the resonant structure in which only the second harmonic wave 2Wp of the pump wave Wp is totally and selectively reflected to resonate through reciprocation only between the first dielectric mirror M1 and the second dielectric mirror M2. The signal wave Ws and the pump wave Wp are incident on the first dielectric mirror M1, but the converted wave Wi, the signal wave Ws, and the pump wave Wp go out from the second dielectric mirror M2. The waves can be led to or from the resonant structure directly or through an optical fiber.

The nonlinear medium is located on the same path of the wave propagation and is not particularly limited only if it has the second-order nonlinearity inherently or has the second-order nonlinearity induced by poling, for example, in a material like a crystal, a semiconductor, a silica, or a polymer. This nonlinear medium can be made in the form of an optical waveguide or an optical fiber to reduce the propagation loss of an optical wave and improve the efficiency of nonlinear interaction, and is configured to satisfy a phase matching condition required on the three wave mixing (see R. L. Sutherland, "HANDBOOK OF NONLINEAR OPTICS," Marcel Dekker, Inc. 1996).

The nonlinear medium having second-order nonlinear susceptibility defined as $\chi^{(2)}$ is implemented by the material that simultaneously satisfies the phase matching condition for the second harmonic generation from the pump wave and the difference frequency generation through a combination of the generated second harmonic wave and the incident signal wave (see J. M. Yarborough and E. O. Ammann, "Simultaneous Optical Parametric Oscillation, Second Harmonic Generation, and Difference Frequency Generation," Appl. Phys. Lett., vol. 18, pp. 145-147, 1971). The dielectric mirrors M1 and M2 serving as the resonant structure transmit the pump wave, the signal wave, and the converted wave but totally reflect the second harmonic wave so that the second harmonic wave may reciprocate in the resonant structure repeatedly.

The nonlinear interaction process is briefly described as follows. The pump wave Wp and the signal wave Ws are transmitted by the first dielectric mirror M1 and propagate through the nonlinear medium. The pump wave Wp is subject to the second harmonic generation process (Wp+Wp–>2Wp) in which the pump wave Wp is converted to the second harmonic wave when the phase matching condition is satisfied. The second harmonic wave having the doubled frequency of 2Wp is then subject to the cascaded difference frequency generation process (2Wp–Ws–>Wi) in which the converted wave Wi having the difference frequency is in a cascaded way generated when the phase matching condition is satisfied simultaneously with the propagating signal wave Ws. The converted wave Wi generated in the cascaded difference frequency generation process is transmitted outside, by the resonant structure at the output side, together with the pump wave Wp and the signal wave Ws which do not participate in the second-order nonlinear interaction but travel as they are.

Meanwhile, the second harmonic wave 2Wp that does not participate in the difference frequency generation process while traveling through the nonlinear medium is totally reflected by the second dielectric mirror M2 at the output side of the resonant structure and goes back along the traveling path. The second harmonic wave is then totally reflected by the first dielectric mirror M1 at the input side of the resonant structure again and propagates in the initial input direction. It is then converted into the converted wave Wi having the difference frequency through the interaction with the new input wave Ws.

When the phase matching condition for the difference frequency generation with respect to the three optical waves of the signal, the second harmonic, and the converted wave traveling in the same direction is once determined and satisfied, the phase matching condition among the three optical waves is completely different from the phase matching condition for the three optical waves including the second harmonic wave reflected at the output side of the resonator and propagates in the opposite direction to the input direction of the signal wave. Accordingly, in the latter case, the converted wave corresponding to the difference frequency is not generated (see I. Brener, M. H. Chou, D. Peale, and M. M. Fejer, "Cascaded Wavelength Converter in LiNbO$_3$ Waveguides with Counter-Traveling Beams," Electron. Lett., vol. 35, pp. 1155-1157, 1999).

Meanwhile, in the real nonlinear medium constituting the traveling-wave type device which allows the optical wave to propagate in a single pass, if the incident intensity of the pump and the signal are Ip and Is, respectively, and the intensity of the converted wave that is obtained by the phenomenon of the difference frequency generation and goes outside is Ii, the intensity of the optical wave having the frequency of 2Wp in the second harmonic generation process is expressed by Equation 1:

$$I_p(2\omega_p) \propto (\chi^{(2)})^2 I_p^2(\omega_p) L^2 \qquad \text{Equation 1}$$

where it is assumed that there is no propagation loss and the conversion efficiency is low in the medium of the second-order nonlinearity $\chi^{(2)}$ and the interaction length L.

Meanwhile, in case of the direct difference frequency generation, the relationship expressed by Equation 2 is satisfied:

$$I_i(\omega_i) \propto (\chi^{(2)})^2 I_s(\omega_s) I_p(2\omega_p) L^2 \qquad \text{Equation 2}$$

Also, in case of the cascaded difference frequency generation, since Ip(2Wp) is provided by the second harmonic generation of the external pump wave having the frequency of $W_p$ as expressed by Equation 1, Ii(Wi) is expressed by Equation 3 (see G. P. Banfi, P. K. Datta, V. Degiogio, and D. Fortusini, "Wavelength Shifting and Amplification of Optical Pulses through Cascaded Second-order Processes in Periodically Poled Lithium Niobate," Appl. Phys. Lett., vol. 7, pp. 136-138, 1998):

$$I_i(\omega_i) \propto (\chi^{(2)} : \chi^{(2)})^2 I_s(\omega_s) I_p^2(\omega_p) L^4 \qquad \text{Equation 3}$$

Accordingly, the intensity of the converted wave generated in the direct difference frequency generation is linearly proportional to the intensity of the signal wave and the pump wave and quadratically proportional to the interaction length, but the intensity of the converted wave generated in the cascaded difference frequency generation is linearly and quadratically proportional to the intensity of the signal wave and the pump wave, respectively, and quartically proportional to the interaction length. Thus the intensity of the converted wave is more sensitive to the change of the pump wave intensity or the interaction length.

The scheme based on the traveling-wave type and the scheme based on the resonant structure differ in the difference frequency generation process clearly. In the former case, in the second harmonic wave having the doubled frequency generated when the pump wave Wp passes through the nonlinear medium, the part of the second harmonic wave which does not participate in the nonlinear interaction generating the difference frequency passes outside as is. On the other hand, in the latter case, the entire part of the second harmonic wave that does not participate in the difference frequency generation and goes out as is in the former case goes back to the input side by the resonant structure at the output and the input side. It is then added to a newly generated second harmonic wave and can generate the converted wave Wi through the interaction with the input signal wave Ws.

Accordingly, the resonance of the second harmonic wave reciprocating or circulating in a repetitive way plays a part of increasing the intensity of the second harmonic wave which is capable of nonlinearly interacting with the signal wave Ws in the nonlinear medium, resulting in the improved intensity of the converted wave Wi having the difference frequency.

A method for determining the optimal resonant length to maximize the wave intensity according to possible examples of feedback conditions in the device of the second harmonic generation and the cascaded difference frequency generation using the resonant structure according to an exemplary embodiment of the present invention will now be described.

FIGS. 2 to 5 illustrate methods for determining the optimal resonant length to maximize wave intensity in the resonant structure according to an exemplary embodiment of the present invention.

A basic principle and an operation in the device of the second harmonic generation and the cascaded difference frequency generation are the same as those described above, but the resonant second harmonic wave may have two basic feedback conditions.

Initially, when only the pump wave having certain intensity is incident on the first dielectric mirror in the absence of an external second harmonic wave, the pump wave passes through the medium and generates the second harmonic wave through the nonlinear interaction without the initial value of the second harmonic wave. As described above, the generated second harmonic wave is reflected by the second dielectric mirror at the output side of the resonant structure having the length L and the first dielectric mirror at the input side, so that it travels in the same direction as the initial incident direction. In this step, there is no external second harmonic wave, but there is the reflected second harmonic wave which is incident again, unlike the initial travel. Accordingly, the initial condition should be different from that in the initial incident process, so that in the next step the operation condition in the second harmonic generation process changes.

If the second harmonic wave that is reflected and incident again contributes to a value of the initial condition for the following second harmonic generation process, it is called a resonant feedback. If the second harmonic wave that is reflected and incident again does not contribute to a value of the initial condition for the following second harmonic generation process, it is called a no-resonant feedback. The optimization of the second harmonic generation and the cascaded difference frequency generation will be described for the case of the two feedback conditions.

In case of the resonant feedback, the second-order nonlinear equations representing the second harmonic generation and the cascaded difference frequency generation in consideration the propagation loss is expressed by Equations 4 to 7:

$$\frac{dE_{p,n}(z)}{dz} = -\frac{\alpha_p}{2}E_{p,n} + iK_p E_{p,n}^* E_{h,n} e^{i\Delta k_{sh} z} \quad \text{Equation 4}$$

$$\frac{dE_{h,n}(z)}{dz} = -\frac{\alpha_h}{2}E_{h,n} + \frac{i}{2}K_h E_{p,n}^2 e^{-i\Delta k_d z} + iK_h E_{s,n} E_{c,n} e^{-i\Delta k_d z} \quad \text{Equation 5}$$

$$\frac{dE_{s,n}(z)}{dz} = -\frac{\alpha_s}{2}E_{s,n} + iK_s E_{c,n}^* E_{h,n} e^{i\Delta k_d z} \quad \text{Equation 6}$$

$$\frac{dE_{c,n}(z)}{dz} = -\frac{\alpha_c}{2}E_{c,n} + iK_c E_{s,n}^* E_{h,n} e^{i\Delta k_d z} \quad \text{Equation 7}$$

where n ($n \geq 0$) indicates the number of resonant cycle, $E_{i,n}(z)$, $\alpha_i$, and $K_i$ (i=p, h, s, c) indicate an electrical field, a loss coefficient, and a coupling coefficient of the pump wave, the second harmonic wave, the signal wave, and the converted wave, respectively, while $\Delta k_{sh}$ and $\Delta k_d$ are elements indicating phase mismatch, but $\Delta k_{sh} = \Delta k_d = 0$ if an actually considered quasi-phase matching condition is satisfied.

The resonant feedback condition is expressed by Equation 8:

$$E_{h,n+1}(0) = b E_{h,n}(L), \quad \text{Equation 8}$$

where b indicates a constant containing reflection coefficients of the dielectric mirrors M1 and M2 ($|b| \leq 1$).

It can be seen in Equation 8 that $E_{h,n+1}(0)$ is determined by the value $E_{h,n}(L)$ of the second harmonic wave at z=L in the n-th circulation, contributing to the value of the second harmonic wave at z=0 in the (n+1)-th circulation. Meanwhile, the intensity of the optical wave is defined as dividing the power by a propagation area and is expressed in CGS unit by Equation 9:

$$I_{i,n}(z) = \frac{cn_i}{2\pi}|E_{i,n}(z)|^2, \quad \text{Equation 9}$$

where c indicates the speed of light and ni indicates the refractive index of the wave.

In case of the second harmonic generation by means of the resonant feedback like this, which corresponds to $E_{s,n}(z) = E_{c,n}(z) = 0$ in Equations 4 to 7 in the absence of the signal and the converted wave, the equations can be solved numerically using Equation 8 as a condition and the intensity of the optical waves can be calculated by Equation 9.

Figure 2:
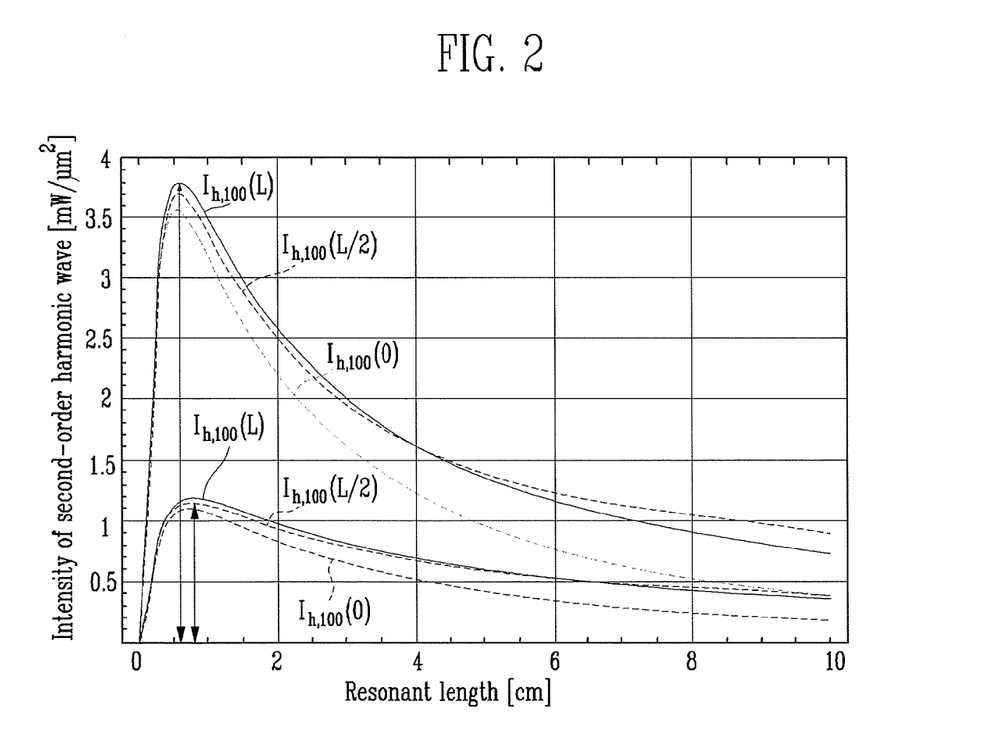
FIGS. 2 to 5 illustrate methods for determining the optimal resonant length to maximize wave intensity in a resonant device according to an exemplary embodiment of the present invention.

FIG. 2 illustrates an example of the method for determining the optimal resonant length by representing the intensity of the resonant second harmonic wave as a function of the resonant length L in the second harmonic generation process under the resonant feedback condition according to an exemplary embodiment of the present invention.

Referring to FIG. 2, in Equations 4, 5 and 9, under the quasi-phase matching condition where $K_{p,s,c}=0.0216$, $K_h=0.0416$, $n_{p,s,c}=2.1544$, $n_h=2.2325$, $\alpha_h=3\alpha_p=0.3$ dB/cm for the propagation loss, and $I_{h,o}(0)=0$ for an initial input condition of the second harmonic wave, the three upper curves are the calculated intensity of the resonant second harmonic wave for the initial pump wave $I_{p,n}(0)=1.0$ mW/μm², while the three lower curves are the calculated intensity of the resonant second harmonic wave for the initial pump wave $I_{p,n}(0)=0.5$ mW/μm², respectively. The upper and the lower curves are calculated and plotted when the number of resonant cycle n is 100, indicating a saturation state after the sufficient resonance. The curves are convergent with no intensity change even when n>100, and show values when z is 0, L/2, and L in the resonant structure having the resonant length L.

As can be seen explicitly in the example of FIG. 2, it can be recognized that there exists the optimal resonant length that maximizes the intensity of the resonant second harmonic wave. When compared with the values where z is zero, which indicates the vicinity of the first dielectric mirror, the optimal length L in the upper curves is equal to 0.6 cm where the maximum intensity is about 3.6 mW/$\mu m_2$, while the optimal length L in the lower curves is equal to 0.8 cm where the maximum intensity is about 1.1 mW/$\mu m^2$. Of course, the maximum intensity and the optimal length at other locations of the resonant structure, e.g. at z=L/2 or z=L, are not greatly different from those at z=0.

This implies that the resonant second harmonic wave exhibits the intensity distribution having the maximum value, and this distribution can be used to select the optimal resonant length, among a large number of the local resonant lengths which satisfy the resonant condition, by which the maximum intensity is obtained under a given external condition. As roughly seen in Equation 1, it proves that, as a typical device of a traveling-wave type gets longer, the wave intensity increases more, but as a device of a resonant type gets longer, it never means that the wave intensity always increases more. Moreover, it can be seen in FIG. 2 that as the wave intensity resonating in the resonator increases more, the optimal resonant length having the maximum value becomes shorter. Meanwhile, it suggests that the resonant device should exhibit the same or more excellent efficiency with the optimal resonant length which is very short and that the typical device of a traveling-wave type can be replaced by the device of a resonant type.

In the case of the cascaded difference frequency generation process under the resonant feedback condition, Equation 8 (the equation for the resonant feedback condition) and Equations 4 to 7 (the nonlinear equations for the cascaded difference frequency generation) can be used together for numerical solutions.

Figure 3:
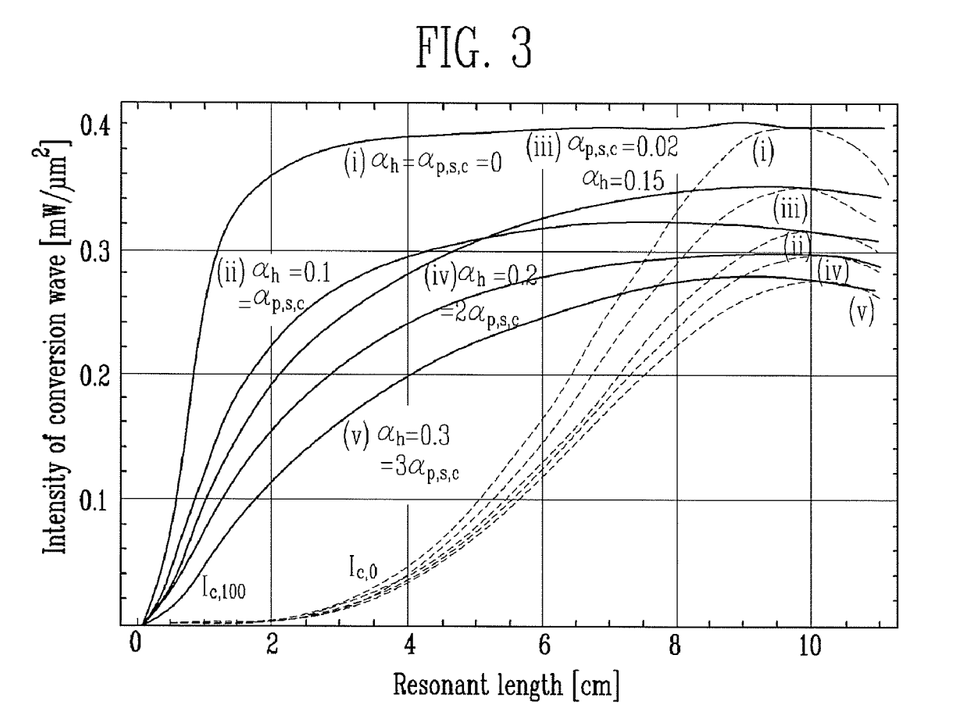

FIG. 3 illustrates an example of the method for determining the optimal resonant length by representing the intensity of the converted wave as a function of the resonant length L in the cascaded difference frequency generation process under the resonant feedback condition according to an exemplary embodiment of the present invention.

Referring to FIG. 3, solid curves $I_{c,100}$ indicate intensity values of the converted wave generated at z=L using the resonant structure, while dotted curves $I_{c,0}$ indicate intensity values of the converted wave at z=L using the typical structure of a traveling-wave type, under the quasi-phase matching condition where $K_{p,s,c}$=0.0216, $K_h$=0.0416, $n_{p,s,c}$=2.1544, and $n_h$=2.2325. There are no initial values of the second harmonic wave and the converted wave ($I_{h,o}(0)=I_{c,n}(0)=0$), but an initial input $I_{p,n}(0)$ of the pump wave is 1.0 mW/$\mu m^2$ and an initial input $I_{s,n}(0)$ of the signal wave is 0.5 mW/$\mu m^2$. For the loss coefficients, (i) $\alpha_h=\alpha_{p,s,c}$=0, (ii) $\alpha_h=\alpha_{p,s,c}$=0.1 dB/cm, (iii) $\alpha_h$=0.15 dB/cm, $\alpha_{p,s,c}$=0.02 dB/cm, (iv) $\alpha_h$= $2\alpha_{p,s,c}$=0.2 dB/cm, and (v) $\alpha_h=3\alpha_{p,s,c}$=0.3 dB/cm are considered. The calculation is performed at the number of resonant cycle n=100, indicating the state in which the curves are convergent after the sufficient resonance, and at the position z=L, indicating the output side of the resonant structure having the device length L.

As can be seen when compared in FIG. 3, the intensity $I_{c,0}(L)$ of the converted wave in the structure of a traveling-wave type increases slowly at the short length region, but increases rapidly at a long length region to reach the maximum value at around L=10 cm. On the other hand, the intensity $I_{c,100}(L)$ of the converted wave in the resonant structure increases rapidly at the short length region, so that the curves are saturated and convergent to the maximum value of the intensity $I_{c,0}(L)$ of the converted wave having the same loss coefficient. The intensity distribution of $I_{c,0}(L)$ of the converted wave corresponds to the intensity distribution of the converted wave in the cascaded difference frequency generation through a single pass in the typical structure of a traveling-wave type. In the example of FIG. 3, in this case, a local maximum value is not explicitly shown, but a region comparable to the maximum value may be determined from the intensity increasing rapidly at the short length region. The resonant length (L) may be selected at around 2 to 4 cm, depending on the loss coefficient, by obtaining the region having about 80% of the maximum value of the intensity $I_{c,0}(L)$ of the converted wave in the structure of a traveling-wave type. This length is relatively short when compared with L=10 cm that is the maximum value of the traveling-wave type device.

What this means is that a proper resonant length comparable to the maximum intensity of the optical wave can be selected from the intensity distribution of the converted wave generated by the resonant structure. In addition, it can be also seen in FIG. 3 that as the output intensity of the converted wave going out from the resonator becomes higher, the curves become saturated and convergent to the maximum value more quickly. Meanwhile, in case of using the resonant device, it implies that the resonant device exhibits similar efficiency with a short length in spite of the efficiency difference, which mainly depends on the loss coefficient, and suggests that the resonant device can as a whole replace the conventional device of a traveling-wave type.

In case of the no-resonant feedback, the second-order nonlinear equations representing the second harmonic generation and the cascaded difference frequency generation in consideration of the propagation loss are generally expressed by Equations 10 to 14:

$$\frac{dE_{p,n}(z)}{dz} = -\frac{\alpha_p}{2}E_{p,n} + iK_p E_{p,n}^* E_{h,n} e^{i\Delta k_{sh} z} \quad \text{Equation 10}$$

$$\frac{dE_{h,n}(z)}{dz} = -\frac{\alpha_h}{2}E_{h,n} + \frac{i}{2}K_h E_{p,n}^2 e^{-i\Delta k_d z} + iK_h E_{s,n} E_{c,n} e^{-i\Delta k_d z} \quad \text{Equation 11}$$

$$\frac{dE_{r,n}(z)}{dz} = -\frac{\alpha_r}{2}E_{r,n} + iK_r E_{s,n} E_{c,n} e^{-i\Delta k_d z} \quad \text{Equation 12}$$

$$\frac{dE_{s,n}(z)}{dz} = -\frac{\alpha_s}{2}E_{s,n} + iK_s E_{c,n}^* (E_{h,n} + E_{r,n}) e^{i\Delta k_d z} \quad \text{Equation 13}$$

$$\frac{dE_{c,n}(z)}{dz} = -\frac{\alpha_c}{2}E_{c,n} + iK_c E_{s,n}^* (E_{h,n} + E_{r,n}) e^{i\Delta k_d z} \quad \text{Equation 14}$$

where the variables and the constants are defined as entirely the same as those in Equations 4 to 7 except that $E_{r,n}(z)$ indicates a resonant wave. The resonant wave, which is generated through the single pass of the pump wave and made to resonate inside the resonator independently, forms an optical wave that does not contribute to the value of the initial condition on the second harmonic wave at the following stage after circulation. When compared, Equations 4 to 7 are entirely the same as Equations 10 to 14 in terms of the second harmonic generation process or the cascaded difference frequency generation process, but are different from Equations 10 to 14 in that the generated second harmonic wave plays the role of the independent resonant wave $E_{r,n}(Z)$ through the no-resonant feedback and directly participates in the difference frequency generation process.

The no-resonant feedback condition is expressed by Equation 15:

$$E_{r,n+1}(0)=b(E_{h,n}(L)+E_{r,n}(L))  \quad \text{Equation 15}$$

It can be seen in Equation 15 that the value $E_{h,n}(L)$ of the second harmonic wave at z=L in the n-th cycle does not contribute to the value $E_{h,n+1}(0)$ of the second harmonic wave at z=0 in the (n+1)-th cycle, but to $E_{r,n+1}(0)$ together with $E_{r,n}(L)$ to be accumulated in the resonant wave.

The second harmonic generation process corresponds to Equations 10 to 14 when $E_{s,n}(z)=E_{c,n}(z)=0$, indicating the absence of the signal and the converted wave. To generate the second harmonic wave under the no-resonant feedback condition, Equations 10 to 14 can be solved numerically using Equation 15 as a condition, and the intensity of the optical waves can be calculated using Equation 9.

Figure 4:
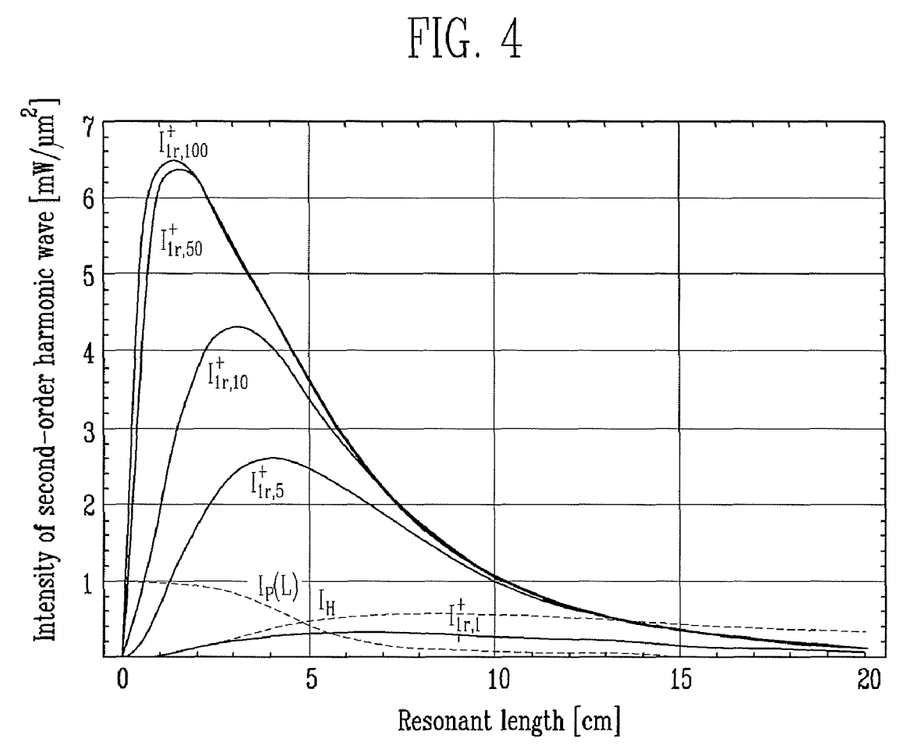

FIG. 4 illustrates an example of the method for determining the optimal resonant length by representing the intensity of the resonant second harmonic wave as a function of the resonant length L in the second harmonic generation process under the no-resonant feedback condition according to an exemplary embodiment of the present invention.

Referring to FIG. 4, in Equations 10 to 14 and 9 under the quasi-phase matching condition where $K_{p,s,c}=0.0216$, $K_h=0.0416$, $n_{p,s,c}=2.1544$, $n_h=2.2325$, and $\alpha_h=3\alpha_p=0.3$ dB/cm for the propagation loss, an initial input $(I_{h,o}(0))$ of the second harmonic wave is $I_{h,o}(0)=0$, but an initial input $(I_{p,n}(0))$ of the pump wave is $I_{p,n}(0)=1.0$ mW/µm². $I_p(L)=I_{p,n}(L)$ indicates the intensity of the pump wave at z=L in the resonant structure having the resonant length L, $I_H=I_{h,n}(L)$ indicates the intensity of the second harmonic wave at z=L, and $I^+_{1r,n}=I_{r,n}(0)$ indicates the intensity of the resonant wave traveling to the same right direction as the incident direction at z=0 near the first dielectric mirror M1.

As expected, as the resonant length L becomes long, $I_p(L)$ decreases monotonically, but $I_H$ increases and then decreases. It can be easily understood that $I^+_{1r,1}<I_H$ because $I_H$ indicates the intensity of the optical wave at z=L, which is generated by propagating through the medium in a single pass, while $I^+_{1r,1}$ indicates the intensity of the optical wave $I_H$ when n=1 on the morrow of the first circulation. If explained in more detail, after the single pass, the generated second harmonic wave of the intensity $I_H$ is reflected by the second dielectric mirror and propagates back to the left with experiencing the loss only and then is reflected again by the first dielectric mirror to be the resonant wave of the intensity $I^+_{1r,1}$ with n=1. In the case of a change in $I^+_{1r,n}$ according to the number of resonant cycle n in the resonant structure, as the number of resonant cycle increases, the intensity of the resonant wave inside the resonator gets strong, the maximum value of the $I^+_{1r,n}$ tends to move to the short resonant length L, and the $I^+_{1r,n}$ is saturated when n is about 100 and convergent with the unchanged intensity even when n>100.

It can be seen explicitly in the example of FIG. 4 that there is the optimal resonant length for maximizing the intensity $I^+_{1r,n}$ of the resonant second harmonic wave. In the curve with n=100, the optimal length L is approximately equal to 1.5 cm where the maximum intensity is 6.4 mW/µm². The maximum value 6.4 mW/µm² corresponds to 640% of the input intensity $I_p(0)$ of the pump wave and to 1070% of the intensity $I_H$ of the second harmonic wave which has the maximum value at around L=9.0 cm. As described in the resonant feedback, it is expected that the maximum intensity and the optimal length at z=L/2 and L, which are other locations of the resonant structure, do not greatly differ from the values above.

This implies that the second harmonic wave resonating under a given external condition exhibits the distribution having the global maximum, among a large number of local maxima corresponding to a large number of resonant lengths, which is used to select the optimal resonant length by which the maximum intensity of the optical wave can be obtained in the given condition. Moreover, it can be also seen in FIG. 4 that as the intensity of the optical wave resonating inside the resonator gets stronger, the optimal resonant length having the maximum value becomes shorter. The distribution also shows that the length of the resonant device can be properly selected since the long resonant device does not necessarily increase the wave intensity and suggests that a typical device of a traveling-wave type should be replaced by the resonant device since the resonant device provides the same or higher efficiency with its very short length.

In the case of the cascaded difference frequency generation process under the no-resonant feedback condition, Equation 15 (the equation for the no-resonant feedback condition) and Equations 10 to 14 (the nonlinear equations for the cascaded difference frequency generation) can be used together for numerical solutions.

Figure 5:
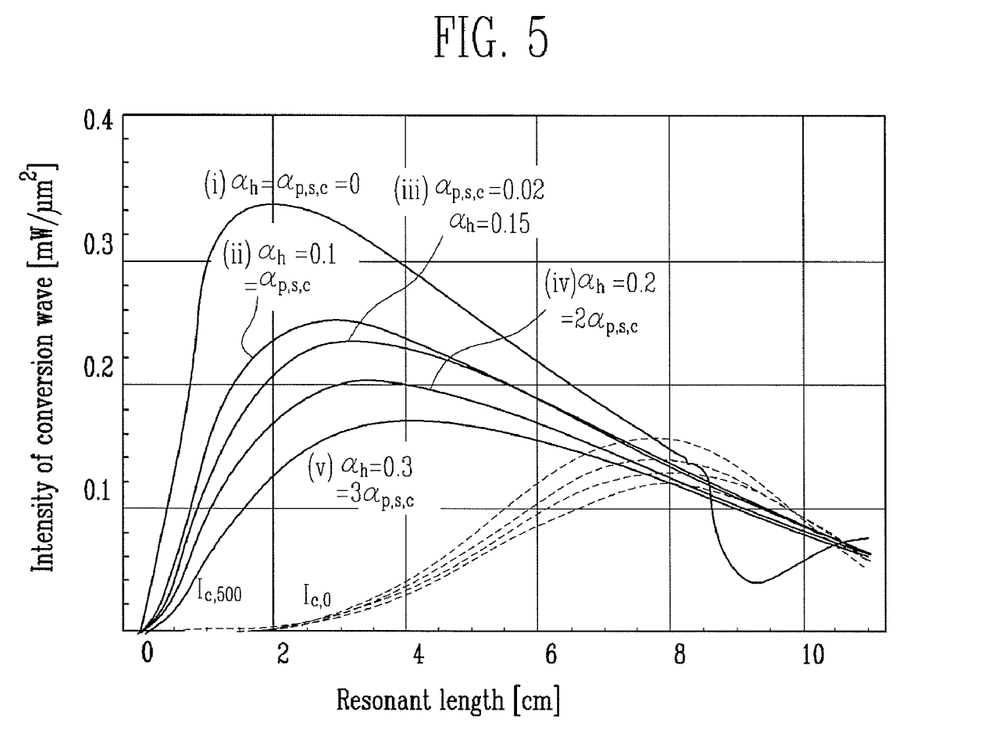

FIG. 5 illustrates an example of the method for determining the optimal resonant length by representing the intensity of the converted wave as a function of the resonant length L in the cascaded difference frequency generation process under the no-resonant feedback condition according to an exemplary embodiment of the present invention.

Referring to FIG. 5, in Equations 10 to 14 and 9 under the quasi-phase matching condition where $K_{p,s,c}=0.0216$, $K_h=0.0416$, $n_{p,s,c}=2.1544$, and $n_h=2.2325$, there are no initial inputs of the second harmonic wave and the converted wave $(I_{h,o}(0)=I_{c,n}(0)=0)$ If an initial input $I_{p,n}(0)$ of the pump wave is 1.0 mW/µm² and an initial input $I_{s,n}(0)$ of the signal wave is $I_{s,n}(0)$ is 0.5 mW/µm², the generated converted wave is stably convergent at around n=500. Solid curves $I_{c,500}$ are plotted to indicate intensity values of the converted wave generated at z=L using the resonant structure, according to the coefficient change of the propagation loss, while dotted curves $I_{c,0}$ are plotted to indicate intensity values of the converted wave generated at z=L using the single pass in the typical structure of a traveling-wave type. For the loss coefficients, (i) $\alpha_h=\alpha_{p,s,c}=0$, (ii) $\alpha_h=\alpha_{p,s,c}=0.1$dB/cm, (iii) $\alpha_h=0.15$ dB/cm, $\alpha_{p,s,c}=0.02$ dB/cm, (iv) $\alpha_h=2\alpha_{p,s,c}=0.2$ dB/cm, and (v) $\alpha_h=3\alpha_{p,s,c}=0.3$ dB/cm are taken into account.

As illustrated in FIG. 5, the converted intensity $I_{c,0}(L)$ in the structure of a traveling-wave type increases at short resonant lengths slowly and increases at long resonant lengths rapidly. If L is about 8 cm, the intensity reaches the maximum value. It should be noted that $I_{c,0}(L)$ in the no-resonant feedback is different from $I_{c,0}(L)$ in the resonant feedback, because in the no-resonant feedback the resonant wave exists independently and interacts with the signal wave and the converted wave directly, as expressed in Equation 12. The intensity $I_{c,500}(L)$ of the converted wave in the resonant structure increases at the short resonant lengths rapidly. The output intensity of the converted wave, if L is about 2 to 4 cm, has the maximum value depending on the loss coefficients. Thereafter, the intensity decreases in a relatively smooth manner. As the output intensity of the converted wave from the resonator gets stronger due to less loss, the optimal resonant length having the maximum value gets shorter. This shows that the resonant device exhibits better efficiency even with the short resonant lengths, although the efficiency is affected by the loss coefficients, and can be used to replace the typical device of a traveling-wave type.

Meanwhile, various modifications can be made to the present invention without departing from the spirit and the scope of the present invention. For example, a new feedback condition can be obtained by combining the above-stated conditions. That is, the resonant feedback and the no-resonant feedback can be combined. This means that, at z=0, a part of the second harmonic wave or the resonant wave which is reflected at z=L and goes back satisfies the resonant feedback condition of the second harmonic wave, while a part of the second harmonic wave or the resonant wave which is reflected at z=L and goes back satisfies the no-resonant feedback condition of the resonant wave, so that the resonant feedback and the no-resonant feedback can occur simultaneously.

In the device of the second harmonic generation or the difference frequency generation, if the second harmonic wave and the resonant wave resonate in a combination of the resonant feedback and the no-resonant feedback, the resonant condition at that time is a combined condition of the resonant feedback and the no-resonant feedback and is expressed by Equations 16 and 17:

$$E_{h,n+1}(0) = pb(E_{h,n}(L) + E_{r,n}(L)) \quad \text{Equation 16}$$

$$E_{r,n+1}(0) = qb(E_{h,n}(L) + E_{r,n}(L)) \quad \text{Equation 17}$$

where p and q are constants (p and $q \geq 0$) and p+q=1.

Using the combined condition in Equations 16 and 17, the optimal resonant length can be determined by defining the distribution of the intensity of the second harmonic wave, the intensity of the resonant wave, the intensity sum of the two optical waves, or the intensity of the converted wave as a function of the resonant length L, using the same method as in the resonant feedback or the no-resonant feedback condition in the second harmonic generation or the cascaded difference frequency generation process.

Meanwhile, the initial inputs of the pump and the signal wave, the loss coefficients, the refractive indexes, and the like as adopted above illustrate an exemplary embodiment of the present invention for the method for determining the optimal resonant length, but various modifications can be made to the present invention without departing from the spirit and the scope of the present invention.

Also, even though the exemplary embodiment is explained theoretically by illustrating an example of the resonant structure in use of the second-order nonlinear interaction, the concept and the applicable scope of the method for the optimization in the resonant structure of the present invention is not limited only to the second-order nonlinear interaction. The method of the present invention can be applied to all of the resonant structures in general and can be also applied to experimental measurements.

Therefore, explanations according to an exemplary embodiment of the present invention given above are to be provided only for the purpose of the illustration, but are not to be provided to limit the present invention defined only by the attached claim and its equivalents.

As described above, the present invention provides a technique for determining the optimal resonant length by applying the resonant structure to the second harmonic generation process and the cascaded difference frequency generation process of the second-order nonlinear optical phenomena, thereby improving the conversion efficiency and maximizing the wave intensity when compared with the conventional simple process of the second harmonic generation and the cascaded difference frequency generation. The present invention can also provide a variety of resonant devices, according to requirements, for the second harmonic generation and the cascaded difference frequency generation by classifying and analyzing the feedback conditions associated with the processes. The concept and the method of the present invention described above can be also applied to resonant structures used in other relevant fields.

While the invention has been shown and described with reference to certain exemplary embodiments thereof, it will be understood by those skilled in the art that various changes in form and details may be made therein without departing from the spirit and the scope of the invention as defined by the appended claims and their equivalents.

What is claimed is:

1. A method for determining an optimal resonant length, among a large number of local resonant lengths each of which satisfies a resonant condition, that maximizes wave intensity in a resonant structure, the method comprising the steps of:

determining the wave intensity of an optical wave inside or going out from the resonant structure, the determined wave intensity being dependent at least on information of the resonant structure comprising: incident wave intensity, the optical interaction inside the resonant structure, the propagation loss, the resonant condition, and a number of resonant cycle, determining the optimal resonant length among the local resonant lengths through defining the intensity distribution of the optical wave as a function of the resonant lengths of the resonant structure, the intensity distribution being obtained by determining the wave intensity while changing the resonant lengths of the resonant structure.

2. The method of claim 1, wherein the resonant structure comprises a medium for inducing nonlinear interaction.

3. The method of claim 1, wherein the resonant structure comprises a second-order nonlinear medium for inducing second-order nonlinear interaction.

4. The method of claim 3, wherein determining the optimal resonant length through defining the intensity distribution of the optical wave inside or going out from the resonant structure comprises the steps of:

putting a pump wave into the resonant structure to generate a second harmonic wave through the second-order nonlinear interaction of the pump wave; and allowing the generated second harmonic wave to resonate in the second-order nonlinear medium, wherein the wave intensity is a wave intensity of the second harmonic wave.

5. The method of claim 4, wherein when the generated second harmonic wave resonates by means of resonant feedback, the intensity distribution of the second harmonic wave is defined as a function of the resonant lengths in the resonant feedback condition defined by the following equation:

$$E_{h,n+1}(0) = bE_{h,n}(L)$$

where n indicates the number of resonant cycle, L indicates the resonant length, and b indicates a constant including reflection coefficients of dielectric mirrors of the resonant structure.

6. The method of claim 4, wherein when the generated second harmonic wave resonates as an independent resonant wave by means of no-resonant feedback, the intensity distribution of the resonant wave is defined as a function of the resonant lengths in the no-resonant feedback condition defined by the following equation:

$$E_{r,n+1}(0)=b(E_{h,n}(L)+E_{r,n}(L))$$

where n indicates the number of resonant cycle, L indicates the resonant length, and b indicates a constant including reflection coefficients of dielectric mirrors of the resonant structure.

7. The method of claim 4, wherein when the generated second harmonic wave resonates by means of a combination of resonant feedback and no-resonant feedback in which the second harmonic wave resonates as an independent resonant wave, the intensity distribution of the second harmonic wave by the partial resonant feedback or of the resonant wave by the partial no-resonant feedback or the distribution of intensity sum of the two optical waves is defined as a function of the resonant lengths in the combined condition of the resonant feedback and the no-resonant feedback defined by the following equation:

$$E_{h,n+1}(0)=pb(E_{h,n}(L)+E_{r,n}(L))$$

$$E_{r,n+1}(0)=qb(E_{h,n}(L)+E_{r,n}(L))$$

where n indicates the number of resonant cycle, L indicates the resonant length, b indicates a constant including reflection coefficients of dielectric mirrors of the resonant structure, and p+q=1.

8. The method of claim 5, wherein when the intensity distribution of the second harmonic wave is defined as a function of the resonant lengths in the resonant feedback condition, the optimal resonant length is determined so that the intensity of the second harmonic wave is the maximum value or less than 30% of the maximum value.

9. The method of claim 6, wherein when the intensity distribution of the resonant wave is defined as a function of the resonant lengths in the no-resonant feedback condition, the optimal resonant length is determined so that the intensity of the resonant wave is the maximum value or less than 30% of the maximum value.

10. The method of claim 7, wherein when the intensity distribution of the second harmonic wave or the resonant wave or the distribution of intensity sum of the two optical waves is defined as a function of the resonant lengths in the combined condition of the resonant feedback and the no-resonant feedback, the optimal resonant length is determined so that the intensity of the second harmonic wave or the resonant wave or the intensity sum of the two optical waves is the maximum value or less than 30% of the maximum value.

11. The method of claim 3, wherein determining the optimal resonant length through defining the intensity distribution of the optical wave inside or going out from the resonant structure comprises the steps of:
putting a pump wave into the resonant structure to generate a second harmonic wave through the second-order nonlinear interaction of the pump wave; and
allowing the generated second harmonic wave to resonate in the second-order nonlinear medium and generating a converted wave with a difference frequency in a cascaded way through the second-order nonlinear interaction of a signal wave and the second harmonic wave,
wherein the wave intensity is a wave intensity of the converted wave.

12. The method of claim 11, wherein when the generated second harmonic wave resonates by means of resonant feedback, the intensity distribution of the converted wave is defined as a function of the resonant lengths in the resonant feedback condition defined by the following equation:

$$E_{h,n+1}(0)=bE_{h,n}(L)$$

where n indicates the number of resonant cycle, L indicates the resonant length, and b indicates a constant including reflection coefficients of dielectric mirrors of the resonant structure.

13. The method of claim 11, wherein when the generated second harmonic wave resonates as an independent resonant wave by means of no-resonant feedback, the intensity distribution of the converted wave is defined as a function of the resonant lengths in the no-resonant feedback condition defined by the following equation:

$$E_{r,n+1}(0)=b(E_{h,n}(L)+E_{r,n}(L))$$

where n indicates the number of resonant cycle, L indicates the resonant length, and b indicates a constant including reflection coefficients of dielectric mirrors of the resonant structure.

14. The method of claim 11, wherein when the generated second harmonic wave resonates by means of a combination of resonant feedback and no-resonant feedback in which the second harmonic wave resonates as an independent resonant wave, the intensity distribution of the converted wave is defined as a function of the resonant lengths in the combined condition of the resonant feedback and the no-resonant feedback defined by the following equation:

$$E_{h,n+1}(0)=pb(E_{h,n}(L)+E_{r,n}(L))$$

$$E_{r,n+1}(0)=qb(E_{h,n}(L)+E_{r,n}(L))$$

where n indicates the number of resonant cycle, L indicates the resonant length, b indicates a constant including reflection coefficients of dielectric mirrors of the resonant structure, and p+q=1.

15. The method of claim 12, wherein when the intensity distribution of the converted wave is defined as a function of the resonant lengths in the resonant feedback condition, the optimal resonant length is determined so that the intensity of the converted wave is the maximum value or less than 30% of the maximum value.

16. The method of claim 13, wherein when the intensity distribution of the converted wave is defined as a function of the resonant lengths in the no-resonant feedback condition, the optimal resonant length is determined so that the intensity of the converted wave is the maximum value or less than 30% of the maximum value.

17. The method of claim 14, wherein when the intensity distribution of the converted wave is defined as a function of the resonant lengths in the combined condition of the resonant feedback and the no-resonant feedback, the optimal resonant length is determined so that the intensity of the converted wave is the maximum value or less than 30% of the maximum value.

* * * * *